United States Patent
Kolbenschlag et al.

(10) Patent No.: US 9,341,062 B2
(45) Date of Patent: May 17, 2016

(54) ELECTROPNEUMATIC FIELD DEVICE

(71) Applicants: Stefan Kolbenschlag, Darmstadt (DE); Christof Weigand, Oberursel (DE)

(72) Inventors: Stefan Kolbenschlag, Darmstadt (DE); Christof Weigand, Oberursel (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 272 days.

(21) Appl. No.: 14/074,041

(22) Filed: Nov. 7, 2013

(65) Prior Publication Data

US 2014/0123846 A1 May 8, 2014

(30) Foreign Application Priority Data

Nov. 7, 2012 (DE) ...................... 20 2012 010 675 U

(51) Int. Cl.
| | |
|---|---|
| *F03B 13/00* | (2006.01) |
| *H02P 9/04* | (2006.01) |
| *F01B 25/00* | (2006.01) |
| *F15B 21/08* | (2006.01) |
| *H02K 35/02* | (2006.01) |

(52) U.S. Cl.
CPC .............. *F01B 25/00* (2013.01); *F15B 21/082* (2013.01); *H02K 35/02* (2013.01)

(58) Field of Classification Search
CPC .................................. H02K 35/02; F16K 1/14
USPC ........................................................... 290/54
See application file for complete search history.

(56) References Cited

U.S. PATENT DOCUMENTS

| | | | |
|---|---|---|---|
| 4,711,266 A | 12/1987 | Leiber | |
| 6,628,019 B2 | 9/2003 | Carroll | |
| 7,960,851 B2* | 6/2011 | Van Huffel | F03B 17/06 290/54 |
| 2012/0153633 A1 | 6/2012 | Kolbenschlag | |
| 2013/0001959 A1* | 1/2013 | Kobayashi | H02K 35/02 290/1 R |

FOREIGN PATENT DOCUMENTS

| | | |
|---|---|---|
| DE | 3213008 | 10/1983 |
| DE | 102004004930 | 8/2005 |
| DE | 102010054878 | 6/2012 |
| WO | 2005099066 | 10/2005 |

\* cited by examiner

*Primary Examiner* — Tulsidas C Patel
*Assistant Examiner* — Thomas Quigley
(74) *Attorney, Agent, or Firm* — Schiff Hardin LLP

(57) ABSTRACT

In an electropneumatic field device for controlling a pneumatic actuator, an energy transducer is provided which converts pneumatic energy into electrical energy. The energy transducer has a working chamber with a pneumatic compressed air inlet via which a compressed air impulse is introduced, a reset chamber, a coil, an armature separating the working chamber and the reset chamber and guided for translational back and forth movement, and a permanent magnet so that electric energy is induced in the coil. The pneumatic compressed air inlet is configured such that the compressed air impulse leaving the compressed air inlet has an inflow direction angle into the working chamber which has an axial angular direction component which is parallel to a translational axial movement direction of the armature.

11 Claims, 3 Drawing Sheets

US 9,341,062 B2

ELECTROPNEUMATIC FIELD DEVICE

BACKGROUND

The disclosure relates to an electropneumatic field device, such as an electropneumatic transducer or an electropneumatic positioner, for controlling a pneumatic actuator. The actuator can for example set up, particularly control, a process flow of a processing plant, such as a refining plant, a chemical plant or a factory automation plant.

An electropneumatic field device according to the preamble of Claim 1 is known from DE 10 2010 054 878 A1. The pneumatic field device comprises an energy transducer which converts pneumatic energy into electrical energy. For this, the energy transducer has a vibratory permanent magnet which induces an electrical output voltage in a coil as an armature during a back and forth movement. The movement is initiated by means of a compressed air impulse, wherein a resetting is realized by means of a permanent magnet in the reset chamber. The armature comprises a sleeve, on the side of which facing away from the pressure working chamber, a permanent magnet is arranged. A compressed air inlet is provided on the cylinder sliding wall regions, which allows compressed air loading of the working chamber when aligned with a supply air opening in the armature sleeve, as a result of which the magnet armature is driven in one direction. Primarily in the case of longer stoppage times, it has been shown that initiating the back and forth movement of the armature was also hampered owing to increased static friction forces. Difficulties also arose in the case of the leak-tightness of the armature relative to the cylinder chamber, wherein leak-tightness is only relevant both at the compressed air inlet and the inlet opening and along the armature surfaces.

SUMMARY

It is an object to overcome disadvantages of the prior art, particularly to improve an electropneumatic field device with an energy transducer, in which by means of a compressed air impulse, an armature magnet is to be moved back and forth, wherein a reliable functionality should be ensured, even in the case of relatively long stoppage times and in particular, compressed air losses within the working chamber should be prevented insofar as this is possible In an electropneumatic field device for controlling a pneumatic actuator, an energy transducer is provided which converts pneumatic energy into electrical energy. The energy transducer has a working chamber with a pneumatic compressed air inlet via which a compressed air impulse is introduced, a reset chamber, a coil, an armature separating the working chamber and the reset chamber and guided for translational back and forth movement, and a permanent magnet so that electric energy is induced in the coil. The pneumatic compressed air inlet is configured such that the compressed air impulse leaving the compressed air inlet has an inflow direction angle into the working chamber which has an axial angular direction component which is parallel to a translational axial movement direction of the armature.

DESCRIPTION OF EXEMPLARY EMBODIMENTS

Figure 1:
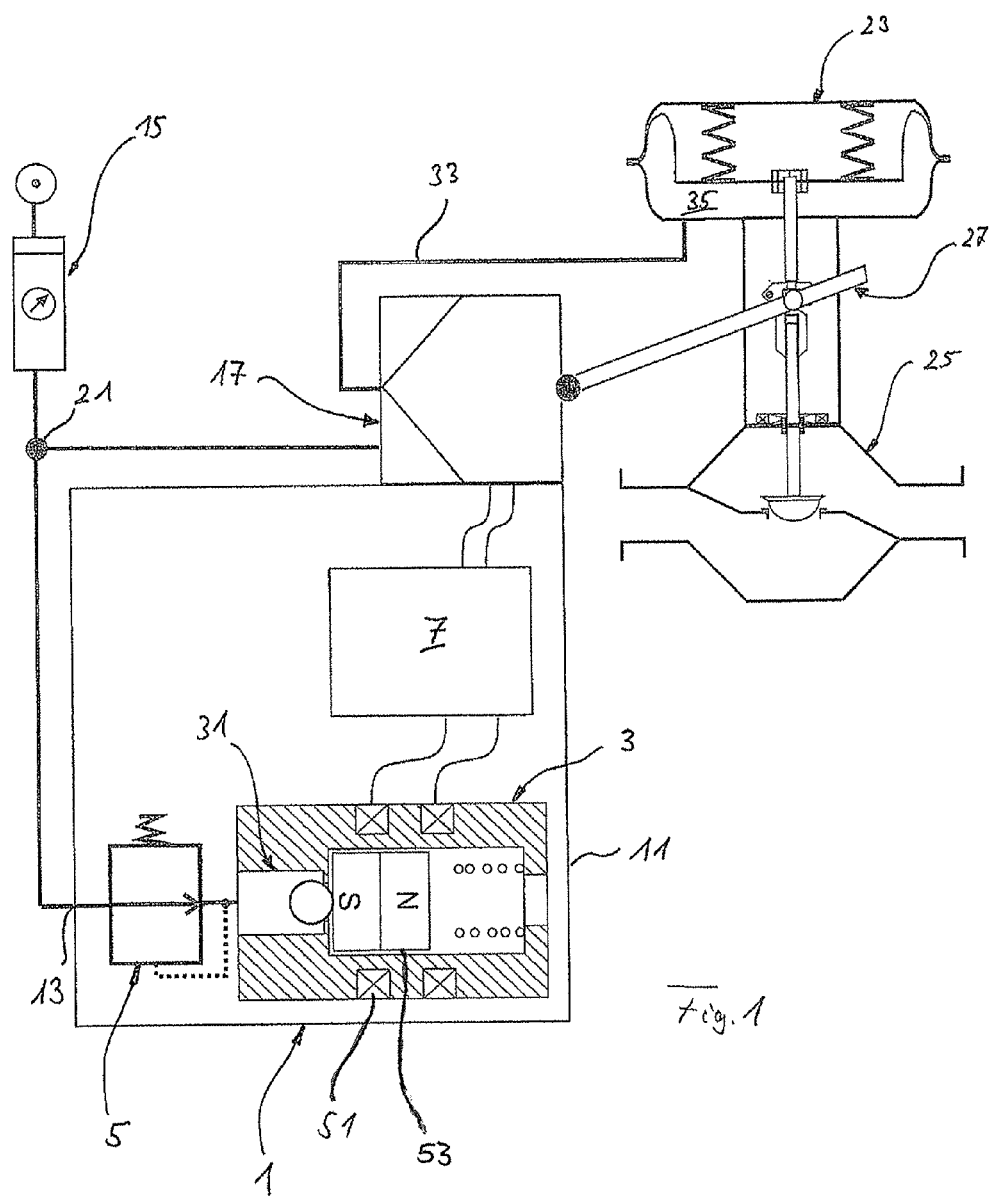
FIG. 1 shows a schematic sketch of a field device according to an exemplary embodiment in cooperation with a pneumatic actuator of a processing plant.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

An electropneumatic field device, like an electropneumatic transducer or an electropneumatic positioner, is provided, which should control a pneumatic actuator. The pneumatic actuator sets up or controls a process flow of a processing plant by being supplied with a pneumatic control signal by the electropneumatic field device. The pneumatic control signal is generated by means of an electrical control signal by the electropneumatic field device. The electropneumatic field device according to one exemplary embodiment comprises an energy transducer which on the basis of the pneumatics provided, particularly on the basis of a constant pneumatic energy source for operating the actuator, provides electrical energy which should finally be used to supply the electropneumatic field device itself with electrical energy and to operate it. Preferably, exclusively the converted electrical energy is used to operate the electropneumatic field device according to the exemplary embodiment. Further electrical energy supplies are preferably obsolete. The energy transducer comprises a working chamber, into which a pneumatic compressed air inlet opens. A compressed air impulse can be introduced into the working chamber in the form of a compressed air flow, particularly in a clocked manner, via the pneumatic compressed air inlet. In addition to the working chamber, the energy transducer has a reset chamber, a coil and an armature or piston armature separating the working chamber and the reset chamber. The armature is guided for a translational back and forth movement with corresponding enlargement or reduction in size of the working chamber or the reset chamber and constructed with or as a permanent magnet, so that electric voltage is induced in the coil during the back and forth movement. The coil can be arranged outside of the reset chamber and/or the working chamber or within a boundary wall of the respective chamber. The coil is to be arranged in such a manner with respect to the magnetic armature that the desired voltage is induced in the coil during the armature movement. The coil essentially extends along the entire movement amplitude of the armature. In the reset chamber for example a return spring or a permanent magnet can be arranged, in order to allow reset forces for the back and forth movement to act on the armature. According to the exemplary embodiment, the pneumatic compressed air inlet is configured in such a manner that the compressed air impulse leaving the compressed air inlet reaches the working chamber with an inflow direction angle which has an axial angular direction component which is parallel to the translational direction of movement of the armature and in particular is directed towards the armature, so that the compressed air impulse flow hits the armature after entering the working chamber. When the compressed air inlet opens, as a result of which the compressed air impulse enters into the working chamber, not only is the pneumatic pressure in the working chamber increased for the back and forth movement, but also pressure impulse forces are conveyed to the armature, in order to set setting the same in motion in a supported manner from its resting position to execute the back and forth movement. In this manner, the static frictional forces acting on the guided armature are overcome more easily and the energy generation process in the energy transducer can start in a functionally reliable manner. As long as the compressed air inlet is open, the compressed air impulse acts on the armature in order to press the same into a distal return position. In the distal return position, the reset forces which are generated inside the reset chamber are at their highest to such an extent that the movement of the armature is reversed and the armature is forced back into the proximal return position. In the meantime, the compressed air inlet is closed. Electric voltage is induced in the coil adjacent to the armature during the back and forth movement. With the orientation of the compressed air impulse reaching the working chamber in the direction of movement of the armature, there is the possibility of arranging the compressed air inlet remotely from sliding regions between the armature and the armature guide, so that sealing issues of the armature separating the chambers are overcome.

In one exemplary embodiment, the axial angular direction component of the inflow direction of the compressed air impulse coincident with the axial direction of movement of the armature is larger than 20% compared to the respective radial angular direction component of the inflow direction angle. Preferably, the axial angular direction component of the inflow direction prevails compared to the radial angular direction component of the inflow direction, so that in particular, the armature is loaded with the compressed air impulse during the entire period of opening of the compressed air inlet.

In a development of the exemplary embodiment, the armature has an axial, in particular cylindrical guide exterior essentially extending in the direction of movement, which interacts with an in particular cylindrical guide interior of the chamber for the guided back and forth movement. Furthermore, the armature has at least one axial end face which functions as pneumatic working surface and faces the compressed air inlet and onto which the compressed air impulse impacts after entry into the working chamber. In this case, the end face constitutes the first flow obstacle for the flow impulse, after it has made it into the working chamber. In a preferred design of the exemplary embodiment, the working chamber has an in particular cylindrical longitudinal wall, along which the armature glides and is guided during its back and forth movement, and an end wall running transversely, particularly perpendicularly to the direction of movement. The end wall is diametrically opposite the armature and the reset chamber. The longitudinal wall is realized to be free of any compressed air inlet at least along the sliding path of the armature, so that the armature can neither close nor expose the compressed air inlet in the course of the back and forth movement, but rather leaves the same uninfluenced. Preferably, the compressed air inlet is placed or introduced in the end wall of the working chamber. In this case, the compressed air inlet can lie in the center of the end wall.

In an exemplary embodiment, the compressed air inlet comprises an inlet channel opening into the working chamber, the cylindrical channel walls of which extend essentially parallel to the direction of movement and/or which is arranged coaxially to the movement central axis of the armature. In this manner, a largest part of the axial directional component for the flow direction is achieved.

In a development of the exemplary embodiment, the air pressure inlet has a receptacle for a return body, such as a return ball. The receptacle can be realized at the end wall side and preferably has a sleeve projection protruding into the working chamber integrally with the end wall, wherein the inlet channel is constructed on the sleeve bottom. The sleeve projection protruding into the working chamber delimits an annular free space in the working chamber, in which when assuming the proximal return position, a sleeve-shaped permanent magnet carrier of the armature can engage, particularly contactlessly.

The return body can be guided in a movable manner in the receptacle. The receptacle forms a seal seat, particularly on the receptacle-side opening edge of the inlet channel. The return body can seal the compressed air inlet in a hermetically closed manner when the return body bears against the seal seat. If the return body sits on the seal seat, it is located in a sealing position.

Preferably, the return body is pressed against the seal seat by means of spring pretensioning and/or magnetism. The return body can be shaped spherically.

In an exemplary embodiment, the return body is formed from ferromagnetic material, so that the permanent magnet of the armature conveys a magnetic attractive force to the return body, which presses the return body against the seal seat. In this case, the attractive force increases when the permanent magnet of the armature approaches the return body. Alternatively and additionally, a pressure spring can be arranged in the receptacle, which presses the return body against the seal seat.

Preferably, the return body is guided essentially parallel to the direction of movement of the armature during its movement out of and into the sealing position. The guiding is designed in such a manner that the return valve finds the seal seat independently when it is forced into the sealing position.

In a development of the exemplary embodiment, when assuming the sealing position the return body protrudes into the working chamber in such a manner, that the armature comes into engagement with the return body when approaching the proximal return position of the back and forth movement, for carrying the same until the proximal reverse position is reached and for forcing it out of the sealing position. Shortly before the armature carries the return body, the largest magnetic attractive forces prevail on the return body. During the carrying of the return body, the seal seat is released by the return body. The release amplitude corresponds to the path of the armature from establishing contact with the return body until the final return position. By opening the compressed air inlet, a compressed air flow makes it into the working chamber and hits the pneumatic working surface of the armature directly, as a result of which the reversal of the direction of movement of the armature is started.

In an exemplary embodiment, the energy transducer has a pneumatic clock generator or pressure reducer, which is in particular arranged adjacently to the receptacle. The clock generator induces a clocked pneumatic loading of the working chamber, particularly of the receptacle.

Furthermore, the field device can have a connection for a preferably constant pneumatic source, to which in particular both the pressure reducing device and also an I/P transducer are connected. The I/P transducer preferably receives an electrical position signal from a processor of the field device or a superordinate control center of the processing plant. The electrical position signal is converted in the I/P transducer into a pneumatic control signal and output to the actuator. The processor of the field device can preferably be electrically supplied by the energy transducer of the field device exclusively. Additionally, the field device can have an electrical storage, such as a capacitor, connected to the energy transducer, in which the electrical energy induced in the coil is temporarily stored.

In an exemplary embodiment, the armature has an external shape which can be constructed in accordance with a loose fit or clearance fit to an internal contour of the working chamber and/or the reset chamber. Preferably, the armature has an in particular sleeve-shaped carrier, on which the permanent magnet is firmly attached. The carrier is preferably produced from a non-magnetic material. It may be clear that the armature can also be formed exclusively by a permanent magnet.

In an exemplary embodiment, the inner contour of the working and/or reset chamber is formed by an in particular cylindrical sleeve, which is in particular produced from a non-magnetic material. Preferably, the cylindrical sleeve of the inner contour is produced from the same material as the non-magnetic armature.

Further features, properties and advantages of the exemplary embodiments become clear by way of the following description on the basis of the attached drawings.

In FIG. 1, the electropneumatic field device is generally provided with the reference number 1 and comprises as main constituents an energy transducer 3, a pneumatic pressure reducer 5 and also a consumer system 7. The energy transducer 3, the pneumatic pressure reducer 5 and also the consumer system 7 are accommodated in a common housing 11 in a hermetically sealed manner. The housing 11 has a pneumatic connection 13, via which the pneumatic pressure reducer 5 is attached to a pneumatic energy source 15. The pneumatic energy source 15 provides a constant but adjustable pneumatic pressure of for example 6 bar. The pressure reducer 5 has the task of aerating and ventilating a compressed air inlet 31 of the energy transducer 3 in accordance with the functionality of the energy transducer 3, in order to induce a back and forth movement of an armature 53 of the energy transducer 3.

The pneumatic energy source 15 is likewise attached to an electropneumatic positioner 17 via a pneumatic switch point 21. According to patent application DE 10 2010 054 878 A1, in accordance with the statements thereof, the consumer system 7 can be realized according to FIGS. 3 to 5. For example, the electrical energy of the energy transducer 3 can be used to operate the positioner 17, a position sensor, etc. The consumer system 7 is electrically connected to the energy transducer 3 and also to the positioner 17. The consumer system is mainly used to prepare the electrical energy generated and either to store it or output it to an end consumer 17.

The positioner 17 actuates the pneumatic actuator 23 which is realized as a lifting drive. A rod arrangement fastened to a movable membrane plate arrangement is coupled with a valve member of a control valve 25 which sets up, particularly controls, a substance flow of a processing plant, which is not illustrated in any more detail. A position sensor 27 is designed to detect the position of the control valve 25 and to forward the same as a signal to the positioner 17.

As is illustrated in FIG. 1, the electrical consumer system 7 and also the positioner 17 can receive electrical energy from the energy transducer 3. The positioner 17 outputs a pneumatic control signal to the pneumatic drive chamber 35 via the pneumatic line 33, as a result of which the rod of the actuator 23 including the valve member of the control valve 25 can be lifted.

In the following, details of the energy transducer 3 are explained on the basis of FIGS. 3a to 3b and FIG. 1.

The energy transducer 3 has a non-magnetic housing 37, which essentially has a cylindrical shape with an inner space, which delimits a working chamber 41 and a reset chamber 43. The reset chamber 43 has a pressure equalization opening 45 on an end face 47 of the housing 37 facing away from the pressure reducing device 5, so that in the case of a reduction in size of the reset chamber 43, no pneumatic overpressure is generated in the reset chamber 43.

In the housing 37 a coil 51 is arranged, in which the electric voltage to be generated is induced. The working chamber 41 is separated from the reset chamber 43 by a movable armature 53, which is arranged such that it can be moved in axial direction A, wherein magnetic poles are indicated by N and S.

Located in the reset chamber 43 is a return pressure spring 55, which forces the armature 53 in the axial direction A against the end wall 57 which is adjacent to the pressure reducer 5.

Constructed on the end wall 57 is the compressed air inlet 61, which has a receptacle 63 sunk into the housing 37, in which a movable return ball 65 is arranged. The cylindrical receptacle 63 opens into the working chamber 41 at an inlet channel 67, the cylindrical path of the channel wall of which essentially extends in the axial direction A. The inlet channel 67 has an opening edge facing the return ball 65, which forms a seal seat, which the return ball 65 occupies in order to close the compressed air inlet 61 with respect to the working chamber 41, which is the operating condition illustrated in FIG. 3a.

The armature 53 can be moved back and forth in the axial direction A between two return positions (distal and proximal with regards to the receptacle 63). As the return ball 65 extends beyond the inlet channel 67 into the working chamber 41, the armature 53 comes into engagement with the return ball 65 when reaching its proximal return position, which is illustrated approximately in FIG. 3b, and presses the same away from the seal seat, so that a pneumatic compressed air impulse, which should be indicated by the arrows 71, can make it into the working chamber 41. The compressed air impulse 71 is in this case directed in such a manner that it leaves the inlet channel 67 with a direction angle having a prevailing axial angular direction component which is essentially parallel to the direction of movement (axial direction A) of the armature 53 and directed onto a working surface 73 of the armature 53.

Owing to the compressed air impulse 71, the direction of movement of the armature 53 is reversed, and the same is distanced in the axial direction A from the compressed air inlet 61, as a result of which the return ball 65 occupies the seal seat again in a sealing manner.

The return ball 65 is made of a ferromagnetic material, so that magnetic attractive forces from the armature 53 act on the return ball 65. As soon as there is contact between the return ball and the armature 53, the return ball 65 is driven away from the seal seat and, during the return movement of the armature 53, back towards the seal seat again. In the process, the return ball adheres to the permanently magnetic armature 53. Alternatively and additionally, as previously described, a pressure spring shown at 100 in FIGS. 3a and 3b can be arranged in the receptacle, which presses the return body 65 against the seal seat.

As soon as the compressed air inlet 61 is closed by occupation of the seal seat, the return spring 55 acts in order to reverse the movement of the armature 53 again.

Owing to the axial back and forth movement of the armature 53 initiated and induced thereby, the desired electric voltage is induced in the coil 51, which voltage is forwarded to the consumer system 7.

Figure 2A:
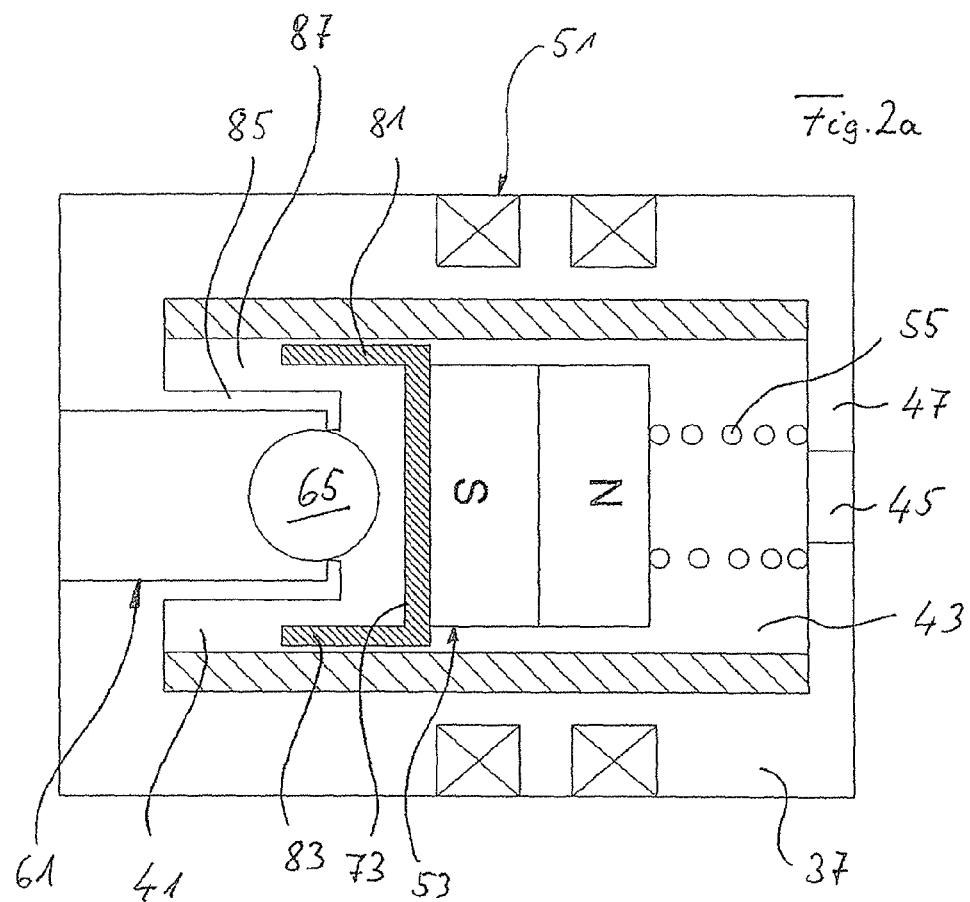
FIG. 2a shows a schematic cross-sectional view of an energy transducer for a field device according to the exemplary embodiment in a compressed-air-free operating condition.
Figure 2B:
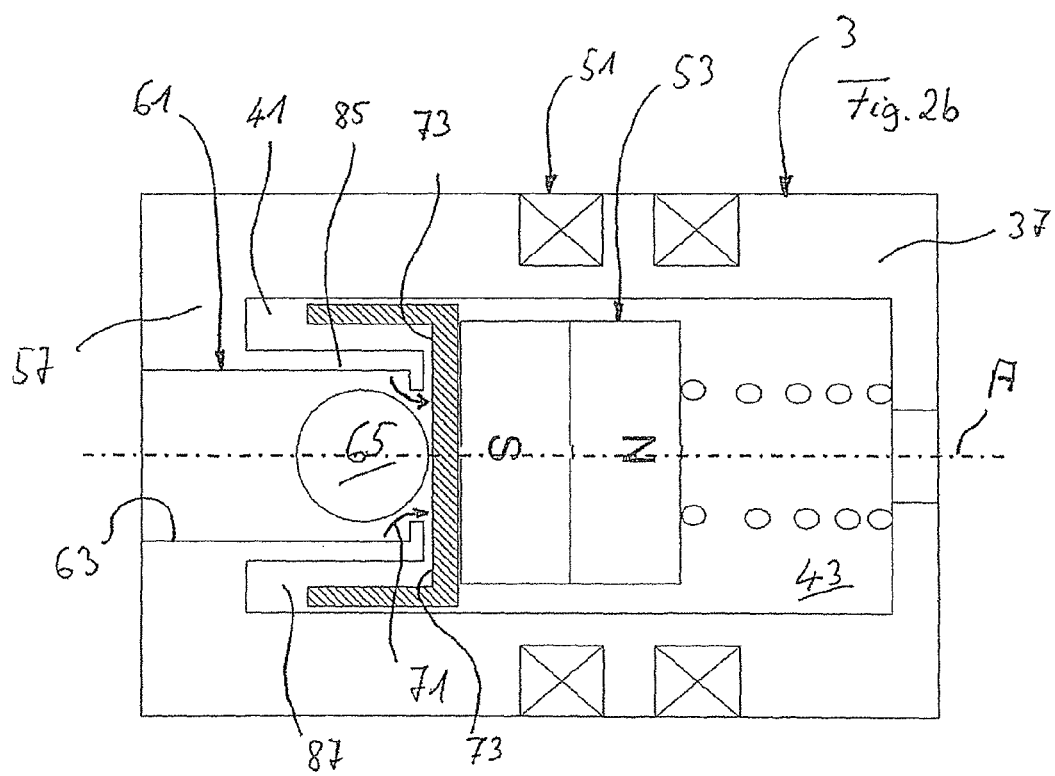
FIG. 2b shows a schematic cross-sectional view of the energy transducer according to FIG. 2a in an operating condition loaded with compressed air.
Figure 3A:
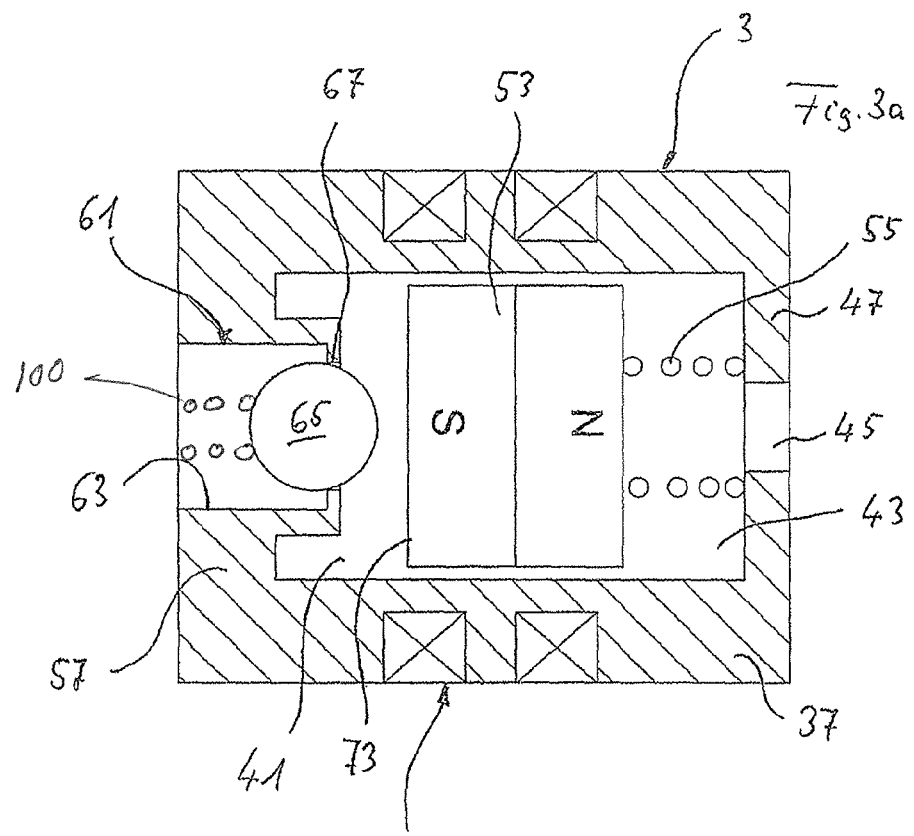
FIG. 3a shows a schematic cross-sectional view of an energy transducer in the embodiment of the field device according to FIG. 1, wherein the compressed-air-free operating condition is illustrated.
Figure 3B:
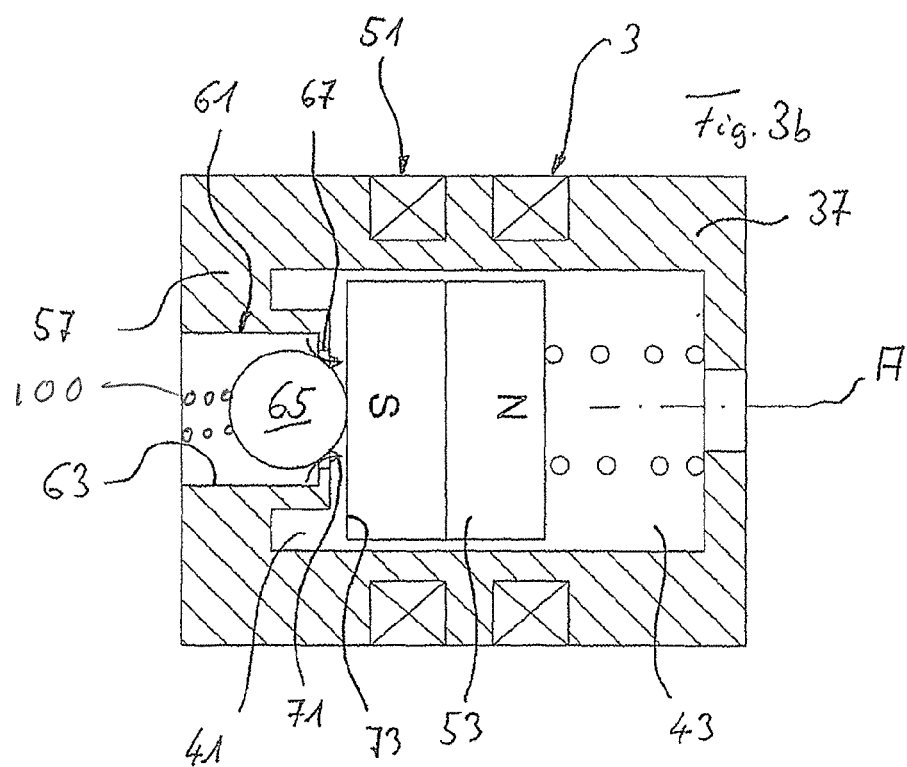
FIG. 3b shows a schematic cross-sectional view of the energy transducer according to FIG. 3a in the operating condition loaded with compressed air.

Illustrated in FIGS. 2a and 2b is a further embodiment of an energy transducer 3, wherein for better readability of the description of the figures, identical reference numbers for similar or identical components of the energy transducer 3 according to FIGS. 3a and 3b are used.

The energy transducer 3 according to the FIGS. 2a and 2b differs from the energy transducer 3 according to FIGS. 3a and 3b in that the armature 53 has a bearing sleeve 81 made of non-ferromagnetic material in addition to the permanent magnet. The permanent magnet is fastened to the bearing sleeve 81. The bearing sleeve 81 comprises a circumferential axial limb 83, the cylindrical exterior of which is adapted to the cylindrical shape of the working chamber 41 or the reset chamber 43. The bearing sleeve 81 effects a guided displaceability of the permanent magnetic armature 53 along the axial direction A.

An end face 73 of the bearing sleeve 81 comes into engagement with the return ball 65, in order to force the same away and out of the seal seat. Magnetic attractive forces act on the return ball 65, because the bearing sleeve 81 is produced from non-magnetic material.

The bearing sleeve 81 offers the advantage of a simplified producibility of the loose fit between the cylindrical interior of the chambers and the armature 53.

In contrast to the embodiment according to FIGS. 3a and 3b, the receptacle 63 is constructed with a larger cylindrical wall projection 85 which projects further into the working chamber 41, as a result of which an annular inner space 87 is formed, in which the circumferential axial ring limb 83 of the bearing sleeve 81 can engage when the armature 53 is in the proximal return position which is illustrated in FIG. 2.

If the armature 53 is in the proximal return position, the same presses the return ball 65 away from the seal seat, as a result of which the pressure impulse 71 can make it into the working chamber against the working surface on the end face 73 of the bearing sleeve 81.

The features disclosed in the above description, the figures, and the claims can be of significance individually as well as in any combination for the realization of the invention in the various embodiments Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. An electropneumatic field device for controlling a pneumatic actuator, comprising:
   an energy transducer which converts pneumatic energy into electrical energy;
   said energy transducer having a working chamber with a pneumatic compressed air inlet via which a compressed air impulse is introduced into the working chamber, a reset chamber, a coil, an armature separating the working chamber and the reset chamber and which is guided for a translational back and forth movement with corresponding enlargement or reduction in size of the working chamber or the reset chamber, and said armature comprising a permanent magnet so that electric energy is induced in the coil during the back and forth movement;
   the pneumatic compressed air inlet being configured in such a manner that the compressed air impulse leaving the compressed air inlet has an inflow direction angle into the working chamber which has an axial angular direction component which is parallel to a translational axial movement direction of the armature; and
   the compressed air inlet having a receptacle for a return body, the return body being guided in a movable manner, the receptacle forming a sealing seat in which the return body sits in a manner sealing the compressed air inlet in a hermetically closing manner when it is in a sealing position.

2. The electropneumatic field device according to claim 1 wherein the axial angular direction component of the inflow direction is larger than 20% of a radial angular direction component of the inflow direction angle.

3. The electropneumatic field device according to claim 1 wherein the working chamber has a longitudinal wall along which the armature glides during its back and forth movement and an end wall running transversely to the direction of movement, the longitudinal wall being free of the compressed air inlet at least along a gliding path of the armature.

4. The electropneumatic field device according to claim 1 wherein the compressed air inlet has an inlet channel opening into the working chamber, cylindrical channel walls of which extend substantially parallel to the movement direction.

5. The electropneumatic field device according to claim 1 wherein the return body is pressed against the sealing seat by means of spring pretensioning or magnetism.

6. The electropneumatic field device according to claim 1 wherein the return body is formed from ferromagnetic material so that the permanent magnet of the armature conveys a magnetic attractive force to the return body which presses the return body against the sealing seat or a pressure spring is arranged in the receptacle which presses the return body against the sealing seat.

7. The electropneumatic field device according to claim 1 wherein the return body is guided substantially parallel to the movement direction of the armature during its movement out of the sealing position and into the sealing position.

8. The electropneumatic field device according to claim 1 wherein the return body protrudes into the working chamber in such a manner when assuming the sealing position that the armature comes into engagement with the return body when approaching a return position of the back and forth movement facing the return body and forces the return body out of the sealing position for releasing the sealing seat by the return body.

9. The electropneumatic field device according to claim 1 wherein the energy transducer has a pneumatic pressure reducer which induces a clocked pneumatic loading of the working chamber, the field device has a connection for a pneumatic source to which both the pressure reducer and also a positioner are connected, and which receives an electrical position signal from a processor of the field device for converting the position signal into a pneumatic control signal and for outputting to the pneumatic actuator, the processor being electrically supplied by the energy transducer.

10. The electropneumatic field device according to claim 1 wherein the armature has an external shape which is constructed in accordance with a clearance fit to an internal contour of the working chamber or the reset chamber, or has a sleeve-shaped carrier for the permanent magnet, said carrier comprising a non-magnetic material.

11. The electropneumatic field device according to claim 1 wherein an inner contour of the working or reset chamber is formed by a cylindrical sleeve produced from a non-magnetic material.

\* \* \* \* \*